US012712220B2

(12) United States Patent
Brown

(10) Patent No.: US 12,712,220 B2
(45) Date of Patent: Aug. 18, 2026

(54) MANUFACTURE OF A THERMOPLASTIC HEAT EXCHANGER

(71) Applicant: Sogefi Air & Cooling USA, Inc., Rochester Hills, MI (US)

(72) Inventor: Corey Brown, Rochester Hills, MI (US)

(73) Assignee: Sogefi Air & Cooling USA, Inc., Rochester Hills, MI (US)

( * ) Notice: Subject to any disclaimer, the term of this patent is extended or adjusted under 35 U.S.C. 154(b) by 134 days.

(21) Appl. No.: 18/646,236

(22) Filed: Apr. 25, 2024

(65) Prior Publication Data

US 2024/0363921 A1 Oct. 31, 2024

Related U.S. Application Data

(60) Provisional application No. 63/462,415, filed on Apr. 27, 2023.

(51) Int. Cl.
*F28F 21/06* (2006.01)
*B29C 65/16* (2006.01)
(Continued)

(52) U.S. Cl.
CPC ..... *H01M 10/6556* (2015.04); *B29C 65/1635* (2013.01); *F28F 21/065* (2013.01); *B29K 2677/00* (2013.01); *B29L 2031/18* (2013.01); *F28F 2255/143* (2013.01); *F28F 2275/067* (2013.01)

(58) Field of Classification Search
CPC ........... H01M 10/6556; H01M 10/613; H01M 10/625; H01M 50/227; B29C 65/1635; B29C 65/1616; B29C 65/1632; B29C 66/71; B29C 66/53461; B29C 66/712; B29C 66/721; B29C 66/73921; B29C 65/70; B29C 65/16; F28F 21/065; F28F 2255/143; F28F 2275/067; F28F 3/12; F28F 21/06; B29K 2677/00; B29L 2031/18; B29L 2031/3468; F28D 1/0308; Y02E 60/10
USPC ... 156/242, 292, 308.2, 308.4, 309.9, 272.8, 156/275.1
See application file for complete search history.

(56) References Cited

U.S. PATENT DOCUMENTS

| | | | |
|---|---|---|---|
| 4,733,718 A * | 3/1988 | Schikowsky | ......... F28F 21/065 261/95 |
| 9,871,276 B2 | 1/2018 | Shaaia et al. | |

(Continued)

*Primary Examiner* — Sarang Afzali
*Assistant Examiner* — Darrell C Ford
(74) *Attorney, Agent, or Firm* — WARNER NORCROSS + JUDD LLP

(57) ABSTRACT

A method for manufacturing a thermoplastic heat exchanger for a battery module is provided. The method includes extruding a battery interface portion comprising a first thermoplastic composition and having a battery interface surface and a chamber surface opposite the battery interface surface; injection molding a base portion comprising a second thermoplastic composition having a channeled surface defining a plurality of channels and an outer surface opposite the channeled surface. The battery interface portion and the base portion are melt-bonded such that the chamber surface cooperates with the plurality of channels of the channeled surface to define a flow chamber for circulation of a thermal cooling fluid within the thermoplastic heat exchanger.

14 Claims, 9 Drawing Sheets

100

Extrude a battery interface portion having a battery interface surface and a chamber surface opposite the battery interface surface, the battery interface portion comprising a first thermoplastic material
102

Injection mold a base portion having a channeled surface defining a plurality of channels and an outer surface opposite the channeled surface, the base portion comprising a second thermoplastic material
104

Melt-bond the battery interface portion and the base portion such that the chamber surface cooperates with the plurality of channels of the channeled surface to define a flow chamber for a thermal fluid within the thermoplastic heat exchanger
106

(51) Int. Cl.

| | |
|---|---|
| ***B29L 31/18*** | (2006.01) |
| ***H01M 10/6556*** | (2014.01) |
| *B29K 677/00* | (2006.01) |

(56) References Cited

U.S. PATENT DOCUMENTS

| | | | | |
|---|---|---|---|---|
| 10,236,546 | B2 | 3/2019 | Huettel | |
| 2011/0206964 | A1 | 8/2011 | Odumodu et al. | |
| 2013/0071720 | A1 | 3/2013 | Zahn | |
| 2015/0273405 | A1* | 10/2015 | Henderson | B01D 71/68 156/244.11 |
| 2015/0369545 | A1* | 12/2015 | Naritomi | F28F 9/26 29/890.03 |
| 2016/0028071 | A1* | 1/2016 | Lev | H01M 10/18 429/210 |
| 2019/0379036 | A1* | 12/2019 | Cadena | H01M 4/0404 |
| 2020/0227794 | A1 | 7/2020 | Mazza et al. | |
| 2021/0167442 | A1* | 6/2021 | Becker | F28D 15/00 |
| 2021/0296728 | A1* | 9/2021 | Kim | B32B 7/08 |
| 2021/0305544 | A1* | 9/2021 | Miloaga | H01M 50/293 |
| 2021/0351455 | A1* | 11/2021 | Kim | B60L 50/66 |
| 2022/0271366 | A1 | 8/2022 | Cate | |
| 2022/0393262 | A1 | 12/2022 | Rosenberger et al. | |

* cited by examiner

Figure 1:
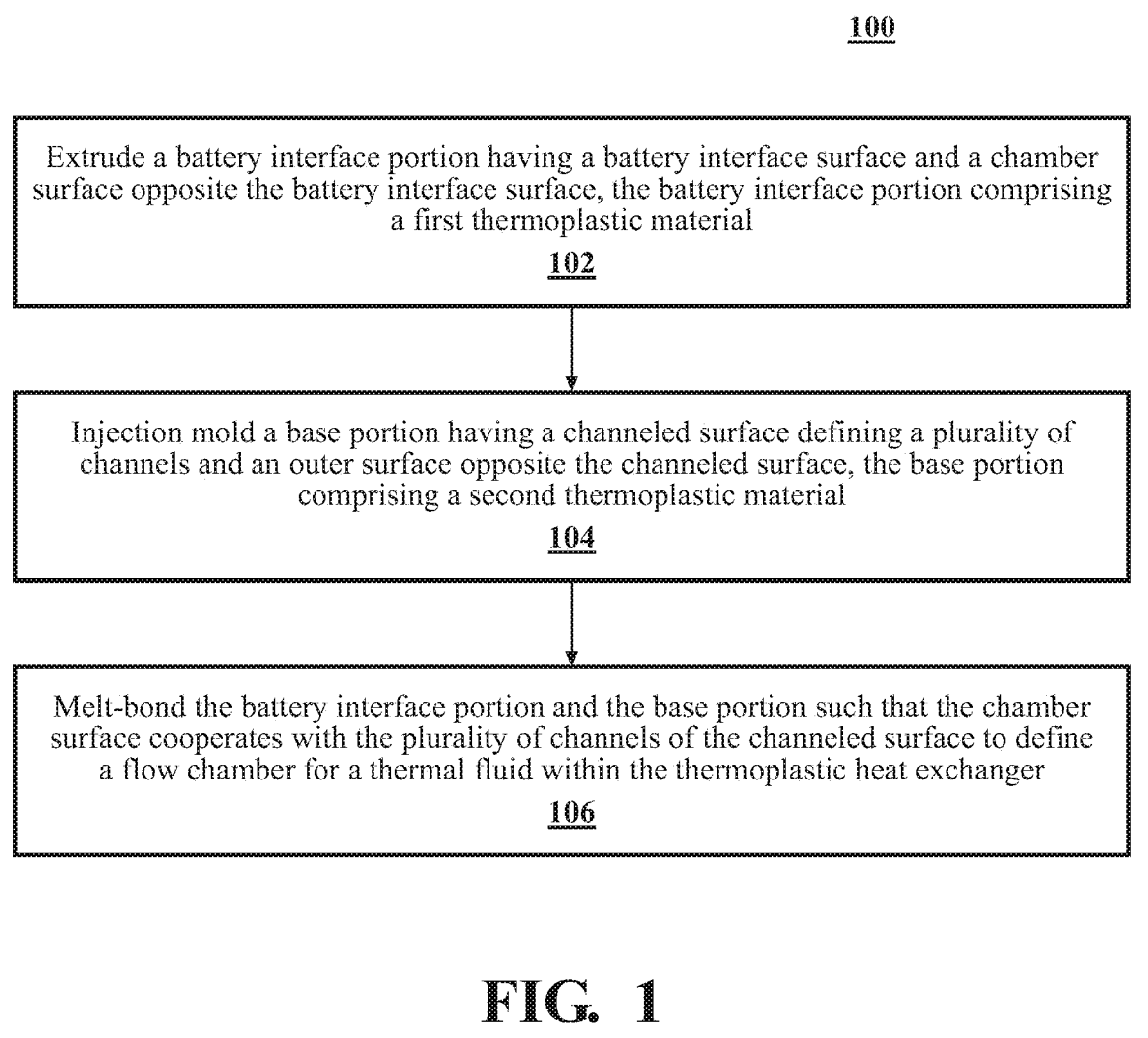

100

Extrude a battery interface portion having a battery interface surface and a chamber surface opposite the battery interface surface, the battery interface portion comprising a first thermoplastic material
102

Injection mold a base portion having a channeled surface defining a plurality of channels and an outer surface opposite the channeled surface, the base portion comprising a second thermoplastic material
104

Melt-bond the battery interface portion and the base portion such that the chamber surface cooperates with the plurality of channels of the channeled surface to define a flow chamber for a thermal fluid within the thermoplastic heat exchanger
106

MANUFACTURE OF A THERMOPLASTIC HEAT EXCHANGER

CROSS-REFERENCE TO RELATED APPLICATIONS

This application claims the benefit of U.S. Provisional Application 63/462,415, filed Apr. 27, 2023, the disclosure of which is incorporated by reference in its entirety.

FIELD OF THE DISCLOSURE

The present disclosure relates to the manufacture of heat exchangers for dissipating heat accumulating in battery cells and in other applications.

BACKGROUND

Heat exchangers, especially those involving fluids such as water, glycol-based liquids, oil, and air, are an indispensable and ubiquitous element of many mechanical, electrical, or hydraulic systems. For example, heat exchangers are commonly used in electrical vehicles to draw heat away from batteries having a high operating voltage. Lithium-ion battery cells are known to generate significant heat during charging and discharging. For this reason, heat exchangers are typically placed in thermal communication with the battery cells to transfer heat to a suitable thermal/cooling fluid.

Metals such as steel, stainless steel, and aluminum have traditionally been used in the construction of heat exchangers, and in particular cooling plates. These materials can be heavy and are welded, brazed, or mechanically assembled to form the necessary architecture of the heat exchanger. Plus, metals can be susceptible to corrosion. Metal corrodes when it reacts with another substance such as oxygen, hydrogen, an electrical current or even dirt and bacteria. Corrosion can also happen when metals like steel are placed under too much stress causing the material to crack.

More recently, hybrid heat exchangers have included both plastic and metal. Plastics can be advantageous due to their ability to be easily molded into complex shapes, thereby reducing manufacturing costs as well as the weight of existing heat exchangers. Hybrid heat exchanges typically include a plastic portion mechanically or adhesively fastened to a metal portion, for example by adhering, crimping, riveting, or bolting the plastic portions, usually with the addition of a gasket material at the interface to assure pressure leak tightness and a hermetic seal. However, hybrid heat exchangers can still be heavy and susceptible to corrosion (e.g., crevice corrosion) at metal-plastic fastening interfaces and bond lines.

As such, there remains a continued need for an improved heat exchanger that is light weight and does not require adhesives, mechanical fasteners or gasket materials and is structurally sound.

SUMMARY

A method for manufacturing a thermoplastic heat exchanger for a battery module is disclosed. The method includes the steps of extruding a battery interface portion comprising a first thermoplastic composition and having a battery interface surface and a chamber surface opposite the battery interface surface; injection molding a base portion comprising a second thermoplastic composition and having a channeled surface defining a plurality of channels and an outer surface opposite the channeled surface; and melt-bonding the battery interface portion and the base portion such that the chamber surface cooperates with the plurality of channels of the channeled surface to define a flow chamber for a thermal cooling fluid within the thermoplastic heat exchanger.

A thermoplastic heat exchanger for a battery module is also disclosed. The thermoplastic heat exchanger includes a battery interface portion comprising a first thermoplastic composition and having a battery interface surface and a chamber surface opposite the battery interface surface; and a base portion comprising a second thermoplastic composition and having a channeled surface defining a plurality of channels and an outer surface opposite the channeled surface. The battery interface portion and the base portion are melt-bonded such that the chamber surface cooperates with the plurality of channels of the channeled surface to define a flow chamber for circulating a thermal cooling fluid within the thermoplastic heat exchanger. Heat from the battery module is transferred to the thermal cooling fluid circulating in the flow chamber to cool the battery module. These and other features of the disclosure will be more fully understood and appreciated by reference to the description of the examples and the drawings.

Before the examples of the disclosure are explained in detail, it is to be understood that the disclosure is not limited to the details of operation or to the details of construction and the arrangement of the components set forth in the following description or illustrated in the drawings. The disclosure may be implemented in various other examples and of being practiced or being conducted in alternative ways not expressly disclosed herein. In addition, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various examples. Unless otherwise expressly stated, the use of enumeration should not be construed as limiting the disclosure to any specific order or number of components. Nor should the use of enumeration be construed as excluding from the scope of the disclosure any additional steps or components that might be combined with or into the enumerated steps or components.

BRIEF DESCRIPTION OF THE DRAWINGS

FIG. 1 is a flow chart describing an exemplary method for manufacturing a thermoplastic heat exchanger for a battery module comprising the steps of extruding a battery interface portion, injection molding a base portion, and melt-bonding the battery interface portion and the base portion to form the thermoplastic heat exchanger.

FIG. 8 is a partial, cross-sectional side view of an embodiment of a thermoplastic heat exchanger including a battery interface portion and a base portion having a.

FIG. 9A is a partial, cross-sectional side view of an embodiment of a thermoplastic heat exchanger including a battery interface portion and a base portion with a spigot molded thereto.

DETAILED DESCRIPTION

Figure 2:
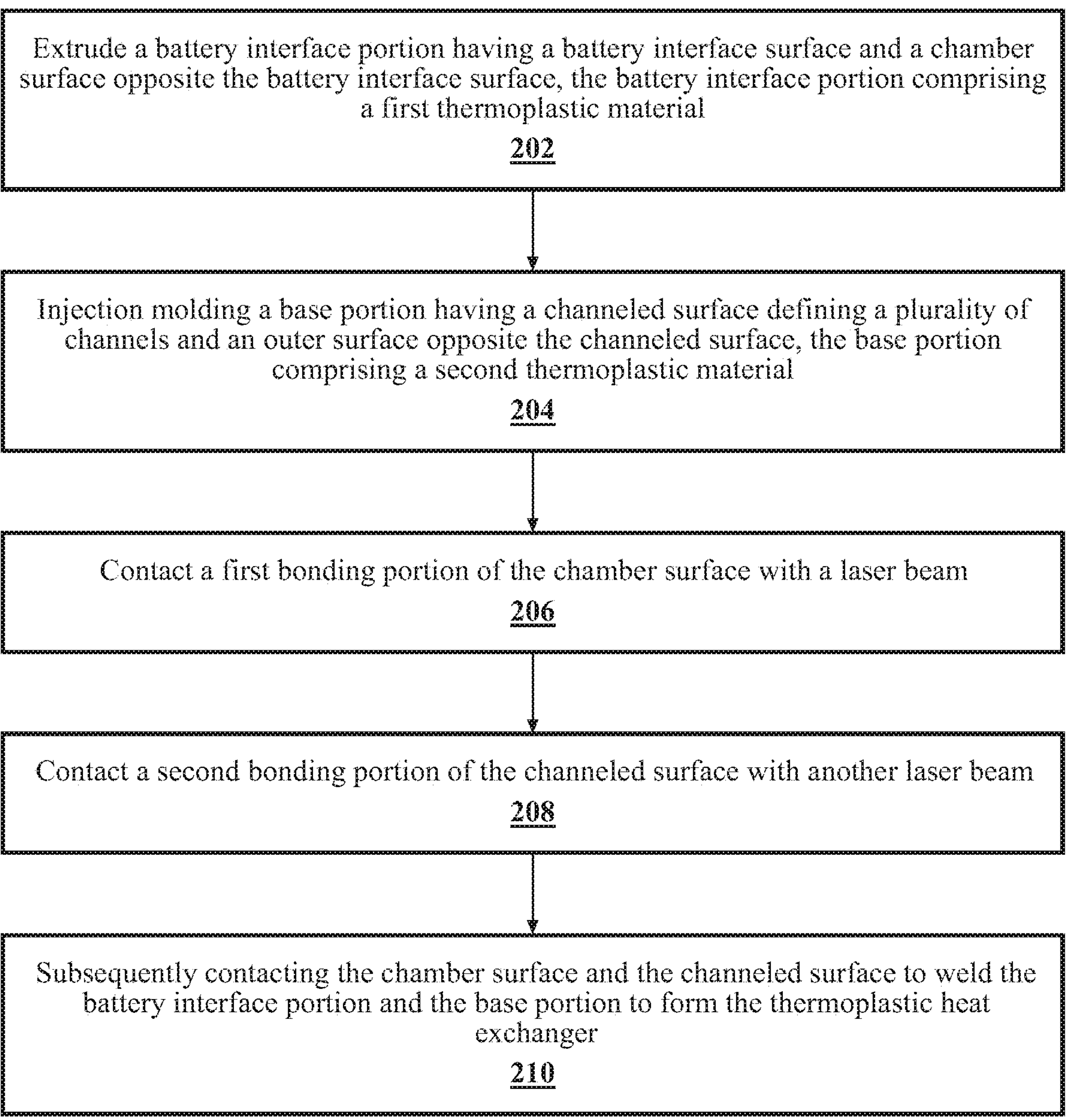
FIG. 2 is a flow chart describing the exemplary method of FIG. 1 including an example of additional steps associated with melt-bonding the battery interface portion and the base portion to form the thermoplastic heat exchanger.

As discussed herein, this disclosure includes a method for manufacturing a thermoplastic heat exchanger. The method is discussed in Part I below, with examples of the thermoplastic heat exchanger discussed in Part II below. While discussed below in connection with a battery heat exchanger, the present method is suitable for a wide range of applications, including heat exchangers for radiators and intercoolers.

I. Method of Manufacture

Referring now to FIG. 1, the method 100 generally includes the steps of:

(1) extruding a battery interface portion comprising a first thermoplastic composition and having a battery interface surface and a chamber surface opposite the battery interface surface 102;

(2) injection molding a base portion comprising a second thermoplastic composition and having a channeled surface defining a plurality of channels and an outer surface opposite the channeled surface 104; and (3) melt-bonding the battery interface portion and the base portion such that the chamber surface cooperates with the plurality of channels of the channeled surface to define a flow chamber for circulation of a thermal cooling fluid within the thermoplastic heat exchanger 106.

The method includes the step of extruding the battery interface portion, which comprises the first thermoplastic composition. In many examples, as is described in greater detail below, the battery interface portion comprises a fibrous filler, which can be directionally oriented during extrusion to improve strength, conductivity, and laser transparency. The battery interface surface of the battery interface portion abuts the battery module whereas the chamber surface, which is opposite the battery interface surface, cooperates with the base portion to form the flow chamber.

During extrusion, the first thermoplastic composition is typically fed as a solid (e.g., in the form of pellets) into an extruder. After entering the extruder, the first thermoplastic composition is heated until molten. The first thermoplastic composition exits the extruder into a die which will have an opening designed to produce the desired profile shape. Upon exiting the dye, the extrudate is cooled, cut and/or stamped to form the battery interface portion.

The method includes the step of injection molding the base portion, which comprises the second thermoplastic composition. The first and the second thermoplastic composition can be the same or different. In many examples, as is described in greater detail below, the base portion comprises a filler, which can be used to improve strength, adjust conductivity (e.g., decrease conductivity) and laser transparency (e.g., decrease laser transparency). The base portion has the channeled surface, which defines the plurality of channels, and the outer surface opposite the channeled surface.

Once formed, the battery interface portion and the base portion are melt-bonded to form the thermoplastic heat exchanger. As alluded to above, the chamber surface abuts the channeled surface to form the flow chamber. In particular, the chamber surface cooperates with the plurality of channels of the channeled surface to define the flow chamber for the thermal cooling fluid within the thermoplastic heat exchanger.

In a preferred example, the step of melt-bonding the battery interface portion and the base portion to form the thermoplastic heat exchanger is conducted via laser welding. The basic principle of laser welding is to irradiate a laser beam on the first and second thermoplastic compositions, which provides energy, transformed into heat, to weld the battery interface portion and the base portion. Advantageously, laser welding the battery interface portion and the base portion form the thermoplastic heat exchanger, which is highly consistent, lightweight, and chemically/environmentally resistant. As is touched on below, the thermoplastic compositions described herein lend themselves well to laser welding under specific circumstances. The step of welding created a weld seam between the battery interface portion and the base portion to provide a robust bond between the portions and to fluidically and hermetically seal the flow chamber (e.g. plurality of channels). Advantageously, the step of weld can be automated.

The battery interface portion and the base portion can be laser welded directly or indirectly, e.g., via transmissible laser welding. Direct laser welding the surface of the polymer is heated to create a melt zone, that ultimately forms the weld seam(s), that joins two components, i.e., the battery interface portion and the base portion together. Direct laser welding involves heating corresponding surfaces on the chamber surface and the channeled surface with a laser until the thermoplastic compositions melt and pressing the battery interface portion and the base portion together until the melted portions cool and forming a bond. An example of indirect welding is laser transmission welding, which is also referred to as laser plastic welding, through-transmission welding (TTLW) and laser polymer welding. The basic principle of laser transmission welding is passing, or transmitting, a laser beam through one piece of plastic to create a weld. Unlike direct welding where the energy is applied at the surface of the materials, transmission welding aims to apply the energy in between two plastic pieces at their interface. Regardless of how the battery interface portion and the base portion contacted with the laser beam, once the melted first and second thermoplastic compositions at the interface (between the two portions) cools, the battery interface portion and the base portion are joined or bonded to form the thermoplastic heat exchanger.

Referring now to the example of FIG. 2, the method 200 includes the steps of extruding the battery interface portion 202 and injection molding the base portion 204. However, in the example of FIG. 2, the battery interface portion and the base portion are melt-bonded via direct laser welding. In some methods, the battery interface portion and the base portion are melt-bonded via mirror welding/hot plate welding, which comprises heating respective surfaces the battery interface portion and the base portion and then contacting the respective surfaces at a pressure and for a time sufficient to weld the battery interface and base portions together. In this example, the step of melt-bonding the battery interface portion and the base portion further comprises the steps of contacting a first bonding portion of the chamber surface with a laser beam 206, contacting a second bonding portion of the channeled surface with another laser beam 208, and subsequently contacting the chamber surface and the channeled surface to weld the battery interface portion and the base portion together and form the thermoplastic heat exchanger 210. Once the lasers are applied, a robot can be used to contact (e.g. press together) the chamber surface and the channeled surface to weld the battery interface portion and the base portion. That is, the two portions can be pressed together with a robot. This step can also be automated in a press assembly. Interface pressures of between 1 MPa and 3 MPa can assure a pressure-tight weld to fluidically and hermetically seal the flow chamber formed.

In some examples, the battery interface portion and the base portion are joined via transmissible laser welding. Referring now to the example of FIG. 3, the method 300 includes the steps of extruding the battery interface portion 302 and injection molding the base portion 304. However, in the example of FIG. 3, the battery interface portion and the base portion are melt-bonded via transmissible laser welding. In some such examples, the step of melt-bonding the battery interface portion and the base portion comprises: contacting the battery interface portion and the base portion to form an interface between the chamber surface and the channeled surface 306; contacting the battery interface surface or the outer surface with a laser beam 308 such that the laser beam travels through the battery interface portion or the base portion, respectively, to melt the first and/or the second thermoplastic compositions at the interface and weld the battery interface portion and the base portion together to form the thermoplastic heat exchanger. Of course, transmissible laser welding requires at least one of the first and/or the second thermoplastic composition be transparent to the laser beam at a particular wavelength or wavelengths. The transmittance of laser radiation (infrared light) is different from the optical transparency of the thermoplastic composition. Thermoplastic compositions that are laser welded do not have to have optical translucency, and welds can be realized with one optically opaque material, e.g. the battery interface portion or the base portion. To this end, the first and/or the second thermoplastic composition may be transparent, to varying degrees, to a laser beam having a particular wavelength. For example, the first thermoplastic composition exhibits greater transparency to a laser beam at a particular wavelength(s) while the second thermoplastic composition exhibits greater transparency to the laser beam at the particular wavelength(s) such that the energy of the laser beam is concentrated at the interface allowing both the first and the second thermoplastic compositions to be melted at the interface. In some such examples, the first thermoplastic composition can be characterized as transparent to laser wavelengths in the infrared and near-infrared spectrum. For example, the first thermoplastic composition could be transparent to a laser beam having a wavelength of 808 nm or 980 nm. More specifically, once the laser beam passes through the first thermoplastic composition it is converted into thermal energy at the interface joining the two portions because the second thermoplastic composition absorbs the light energy of the laser beam to create heat and melt the first and second thermoplastic compositions.

Of course, the battery interface portion (extruded side) could be laser transparent, and the base portion (molded side) could be laser absorbing to create the weld or the base portion (molded side) could be laser transparent, and the battery interface portion (extruded side) could be laser absorbing to create the weld.

In some examples, the second thermoplastic composition can be characterized as transparent to laser wavelengths in the infrared and near-infrared spectrum. For example, the second thermoplastic composition could be transparent to a laser beam having a wavelength of 808 nm or 980 nm. In such examples, the second thermoplastic composition exhibits greater transparency to a laser beam at a particular wavelength(s) while the first thermoplastic composition exhibits less transparency to the laser beam at the particular wavelength(s) such that the energy of the laser beam is concentrated at the interface allowing both the first and the second thermoplastic compositions to be melted at the interface. More specifically, once the laser beam passes through the second thermoplastic composition it is converted into thermal energy at the interface joining the two portions because the first thermoplastic composition absorbs the light energy of the laser beam to create heat and melt the first and second thermoplastic compositions.

Figure 3:
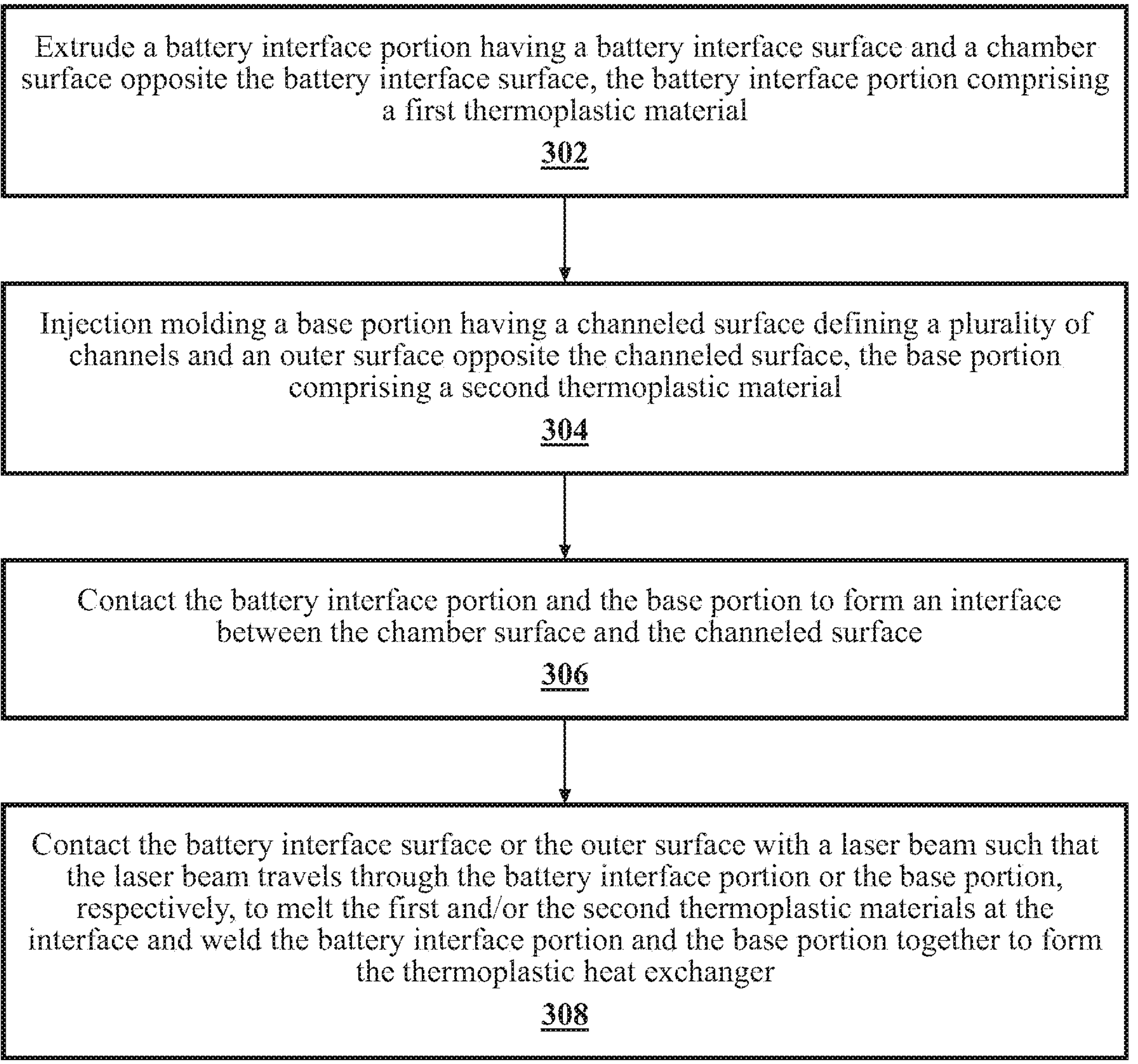
FIG. 3 is a flow chart describing the exemplary method of FIG. 1 including another example of additional steps associated with melt-bonding the battery interface portion and the base portion to form the thermoplastic heat exchanger.

The example methods of FIGS. 2 and 3 create a minimal amount of mechanical stress on the thermoplastic heat exchanger, allow for precise energy control, create strong/durable welds, produce minimal flash and particulate development as well as clean consistent welds down to the micrometer range. Plus, the methods allow for fast cycle times.

Regardless of how the battery interface portion and the base portion are laser welded in the examples set forth, once the laser light energy is converted into heat by the absorbing portion, that thermal energy still must be transferred to the other portion to allow for the first and the second thermoplastic compositions to soften and melt. By ensuring the contact between the two portions is sufficient, the heat energy can be conducted to the transparent portion. In the method of FIG. 2, the first and the second thermoplastic compositions are melted via laser and then contacted. In the method of FIG. 3, the first and the second thermoplastic compositions contacted and then are melted at the interface via laser.

The thermoplastic heat exchanger includes an inlet port and an outlet port. The inlet port defines a first opening in fluid communication with the plurality of channels through which thermal cooling fluid enters the plurality of channels. The outlet port defines a second opening in fluid communication with the plurality of channels through which thermal cooling fluid exits the plurality of channels. Circulation of the thermal cooling fluid within the thermoplastic heat exchanger allows for the transfer of heat from an object, e.g. a battery cell, to the thermal cooling fluid circulating in flow chamber.

The inlet port and the outlet port typically comprise a thermoplastic body having a proximal end, a distal end, an exterior surface, and an interior surface. For purposes of the subject disclosure proximal refers to situated nearer to the point of attachment to the thermoplastic heat exchanger whereas a distal refers to situated away from the point of attachment to the thermoplastic heat exchanger. As such, a proximal direction means towards the point of attachment to the thermoplastic heat exchanger whereas a distal direction means away from the point of attachment to thermoplastic heat exchanger. The thermoplastic body includes a bonding flange and a retaining structure for a coupler. The bonding flange is at the proximal end of the thermoplastic body. The retaining structure is typically spaced axially from the distal end of the thermoplastic body. The inner surface of the thermoplastic body defines a flow chamber that is in fluidic communication with the flow chamber.

In some embodiments, the thermoplastic heat exchanger includes an inlet port and an outlet port, sometimes referred to as an inlet spigot and an outlet spigot, comprising a third and a fourth thermoplastic composition, respectively. The third and the fourth thermoplastic composition can be the same or different than the first and second thermoplastic compositions. In some examples, the third and the fourth thermoplastic compositions are the same as the first thermoplastic composition or at least include a common thermoplastic binder, e.g., polyamide 6. In other examples, the third and the fourth thermoplastic compositions are the same as the second thermoplastic composition or at least include a common thermoplastic binder, e.g., polyamide 6. The inlet port and the outlet port are typically injection molded.

In many embodiments, the inlet port has a body comprising the third thermoplastic composition and defining a first opening in fluid communication with the flow chamber. In many embodiments, the outlet port has a body comprising the fourth thermoplastic composition and defining a first opening in fluid communication with the flow chamber. In a preferred embodiment, the inlet port and the outlet port are molded to the base portion. The inlet port and the outlet port can be injection molded as a feature of the base portion. In some embodiments, the inlet port and the outlet port are injection molded as a feature of the base portion and the third and fourth polymeric compositions are the same as the second polymeric composition. In other embodiments, the inlet port and the outlet port are injection molded and then insert molded into the base portion and can thus the third and fourth polymeric compositions can be different than the second polymeric composition. Alternatively, the inlet port and the outlet port can be spin molded or spin welded to the base portion.

As mentioned above, the inlet port and the outlet port can be spin welded to the thermoplastic heat exchanger. Spin welding is a friction welding technique used on thermoplastic compositions, in which the components to be welded, e.g., the inlet port and the outlet port, are welded via heat generated by friction. The heat is generated rotationally by turning on a lathe, a drill press, a milling machine, or fixture on a manufacturing line, where one part, e.g., the inlet port, is rotated and the part, e.g., the base portion is held stationary with the spinning part driven against it. This is continued until the heat of friction between the parts reaches a sufficient level for the parts to weld. The stationary part is then released to spin as well, while pressure is applied along the axis of rotation, holding the parts together as they cool. Of course, the method of the subject disclosure contemplates spin molding of the inlet and the outlet port prior to the step of melt-bonding the battery interface portion and the base portion, or subsequent to the step of melt-bonding the battery interface portion and the base portion. An opening can be formed, e.g., drilled into the battery interface portion and the base portion. In some examples, an opening can be injection molded into the base portion. In other examples, both the battery interface portion and the base portion to define a perimeter of the opening, i.e., the perimeter of the opening is defined in part by the battery interface portion and in part by the base portion.

As mentioned above, in some examples, the inlet and outlet ports are molded into the base portion and/or the battery interface portion. For example, the inlet port and outlet port can be molded into the base portion. As another example, the inlet port and outlet port can be molded or die cut into the battery interface portion. As yet another example, the inlet port can be molded into the base portion and the outlet port can be molded into the battery interface portion (or vice versa). When the ports are formed as part of, or integral with, the base portion and/or the battery interface portion, the need to produce separate ports is eliminated and thus the step of joining, e.g., via spin welding as described above, the ports to the battery interface portion and/or the base portion is eliminated.

In some examples, two openings (one for the inlet port and another for the outlet port) are drilled and/or molded into the battery interface portion and/or the base portion, with the openings being in fluid communication with the flow chamber. Preferably, the openings are molded into the base portion, which eliminates the step of drilling. Each of the inlet port and the outlet port is rotationally contacted about a perimeter of each respective opening to generate friction sufficient to melt a portion of the thermoplastic composition. Once each of the melted portion of thermoplastic composition cools, the inlet port and the outlet port are joined or bonded to the thermoplastic heat exchanger.

Figure 4A:
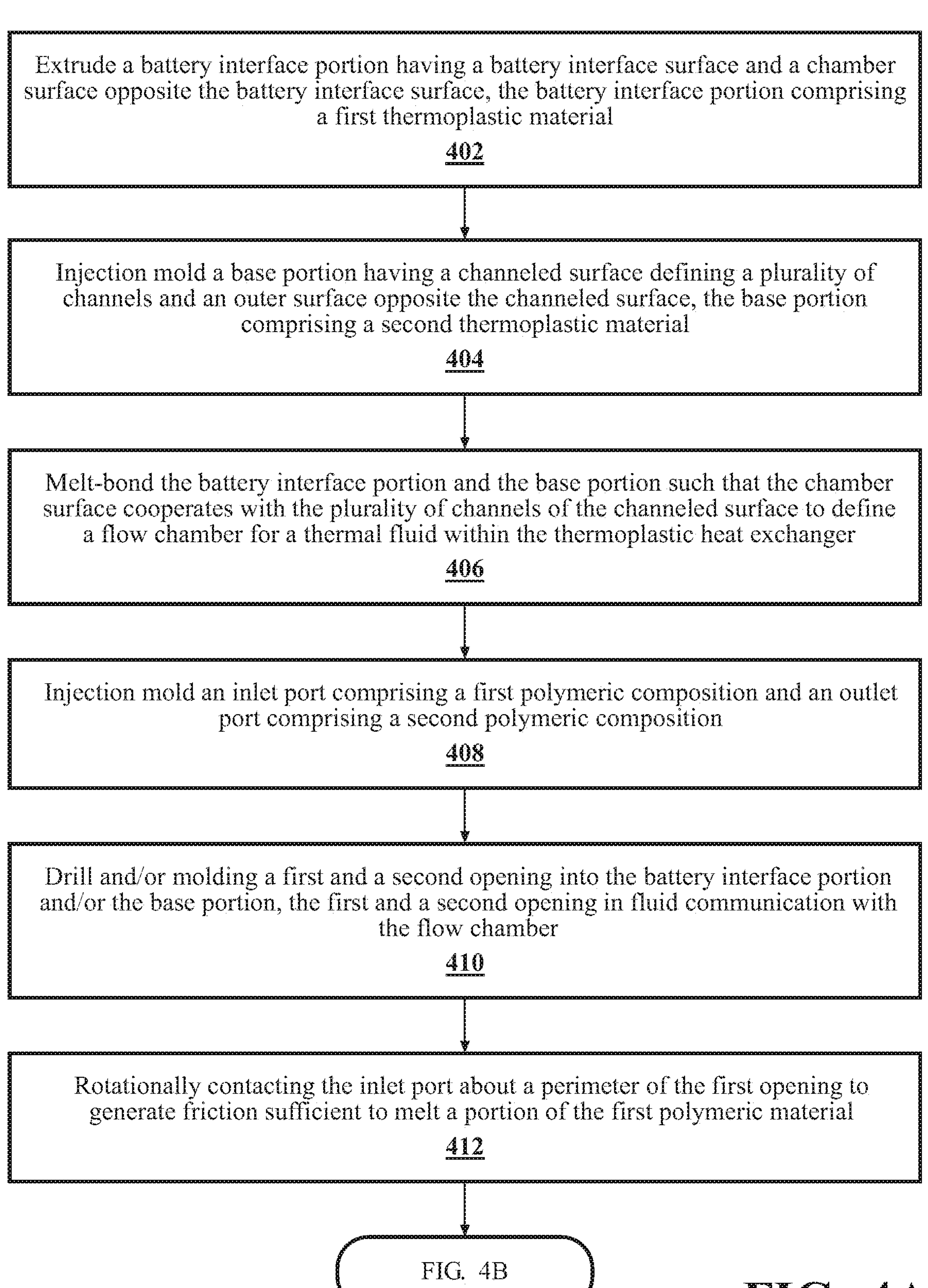
FIGS. 4*a* and 4*b* are a flow chart describing the exemplary method of FIG. 1 including additional steps associated with welding an inlet port and an outlet port to the thermoplastic heat exchanger.
Figure 4B:
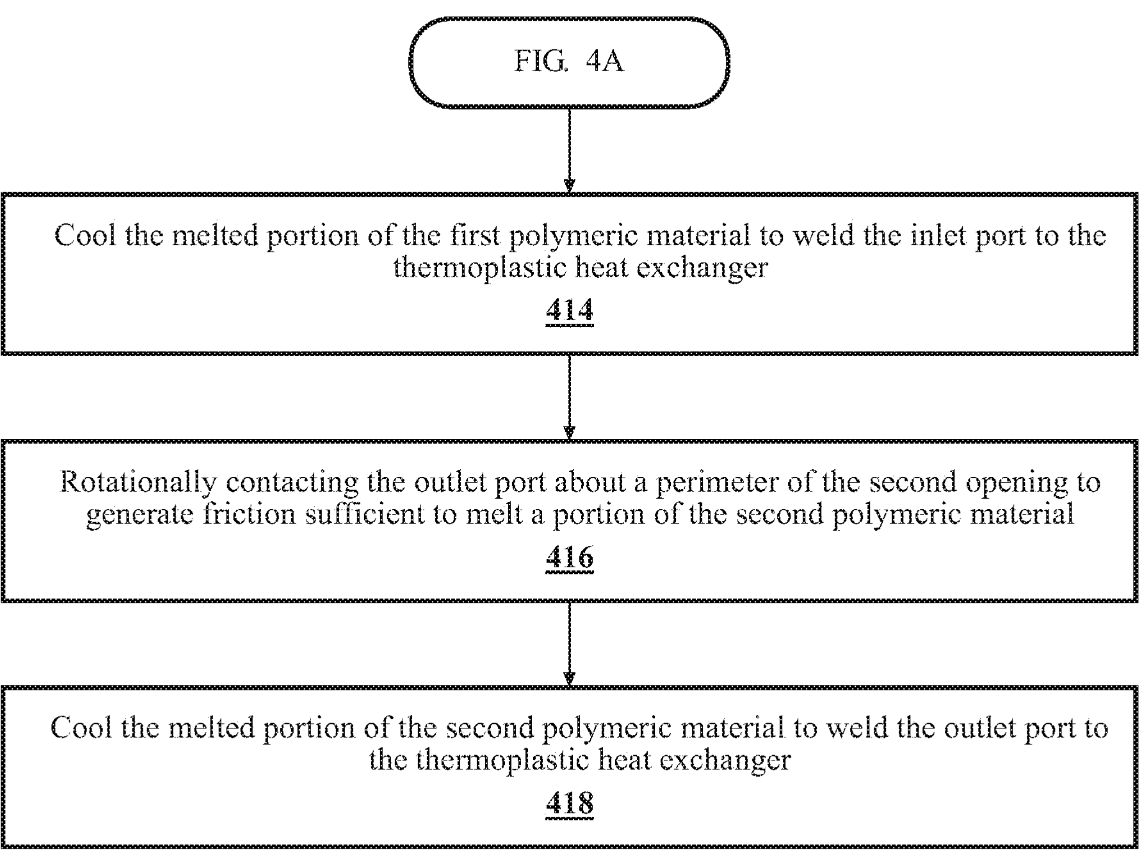

For example, referring now to the example of FIG. 4, the method 400 includes the steps of extruding a battery interface portion 402, injection molding a base portion 404, and melt-bonding the battery interface portion and the base portion to form thermoplastic heat exchanger 406. Further, in this example, the inlet port comprising the third thermoplastic composition and the outlet port comprising the fourth thermoplastic composition are injection molded 408. In addition, a first and a second opening are formed, e.g., drilled, into the battery interface portion and/or the base portion 410, wherein the first and second opening are in fluid communication with the flow chamber. Once the first and second openings are formed, the inlet port is rotationally contacted about a perimeter of the first opening to generate friction sufficient to melt a portion of the third thermoplastic composition 412 and the melted portion of the third thermoplastic composition is cooled to weld the inlet port to the thermoplastic heat exchanger 414. Of course, this method also includes rotationally contacting the outlet port about a perimeter of the second opening to generate friction sufficient to melt a portion of the fourth thermoplastic composition 416 and cooling the melted portion of the fourth thermoplastic composition to weld the outlet port 418 to the thermoplastic heat exchanger. The first and the second thermoplastic compositions may also be melted in the spin molding process described. It should be appreciated that "about the perimeter of the first opening" and "about the perimeter of the second opening" as used herein describe the first and/or second thermoplastic compositions on the surface that define the first and second openings.

Production of a battery interface portion having a flat surface and a thermoplastic heat exchanger with minimal thickness tolerances is desired to improve cooling efficiency, e.g., to facilitate efficient extraction of calories. To maintain minimal surface and thickness tolerances (reduce variation) in the production of the thermoplastic heat exchanger, the step of cooling should be carefully controlled, e.g., times and pressures utilized. In other words, holding the part while fixtured can be necessary to meet the overall flatness of the final product. Holding the portions of the thermoplastic heat exchanger in place securely for a given period of time at a given pressure during laser welding helps produce the thermoplastic heat exchangers with minimal dimensional variation. In some examples, the method includes the step of laser cutting the battery interface portion and/or the base portion to form alignment features, which ensure proper alignment and joining of the battery interface portion and the base portion to produce the thermoplastic heat exchanger that is dimensionally consistent.

II. Thermoplastic Heat Exchanger

Figures 5, 6:
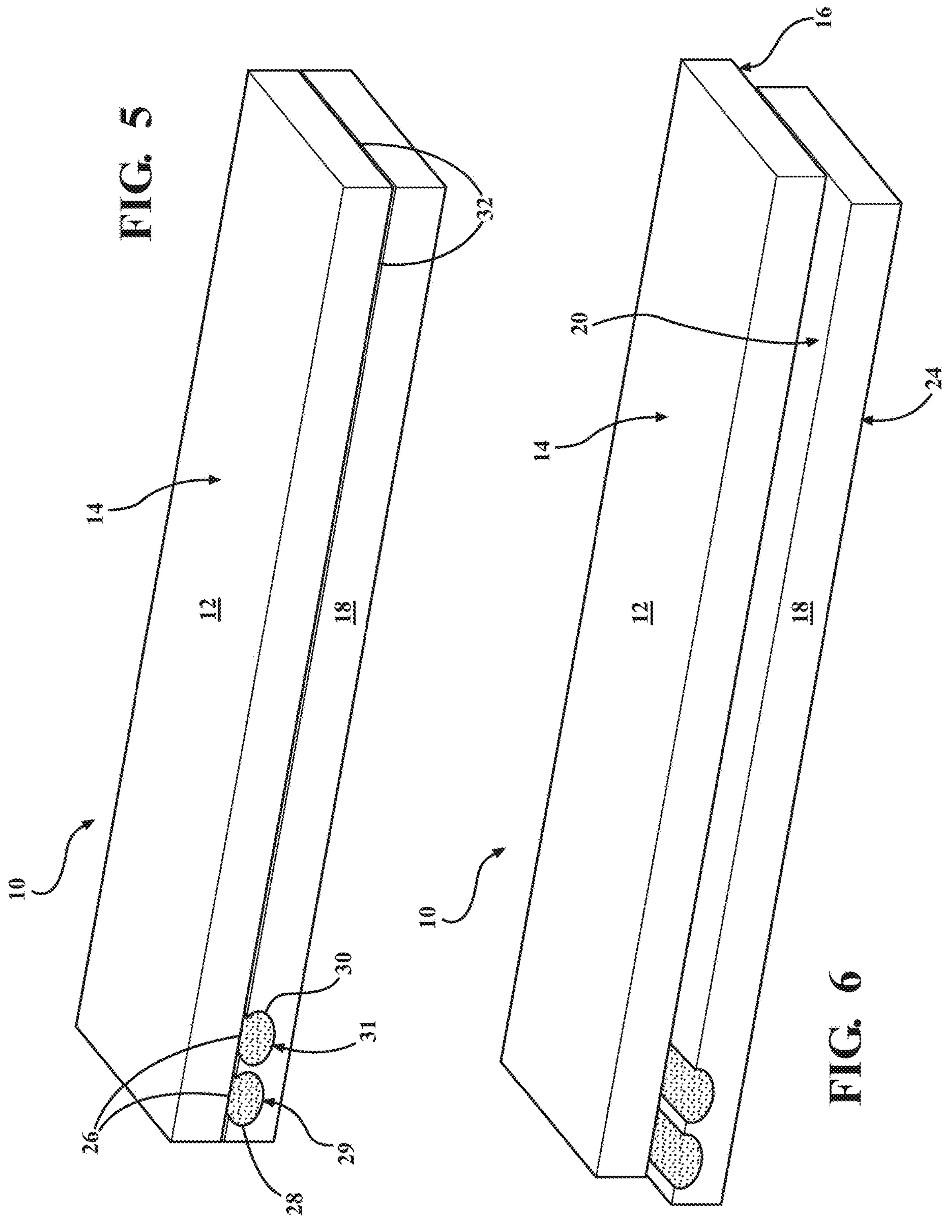
FIG. 5 is a perspective view of an embodiment of a thermoplastic heat exchanger including a battery interface portion and a base portion.
FIG. 6 is an exploded, perspective view of the thermoplastic heat exchanger of FIG. 5.
Figure 7:
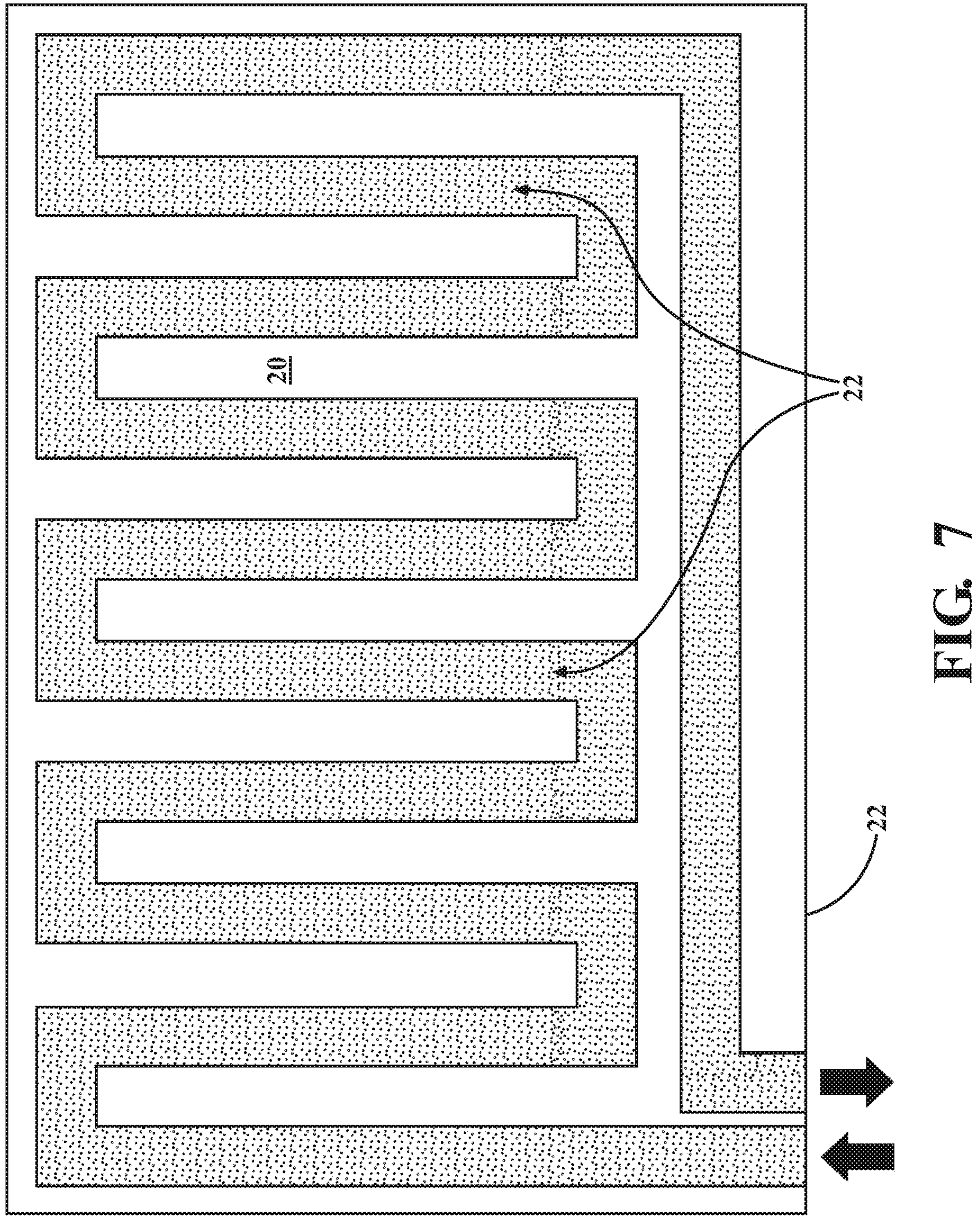
FIG. 7 is an isolated, top view of the base portion of the thermoplastic heat exchanger of FIG. 5.

As one example, the present method can be applied in the manufacture of a thermoplastic heat exchanger for a battery module (not illustrated). Referring now to FIGS. 5-7, the thermoplastic heat exchanger is generally illustrated. The thermoplastic heat exchanger 10 includes a battery interface portion 12 comprising a first thermoplastic composition and having a battery interface surface 14 and a chamber surface 16 opposite the battery interface surface 14; and a base portion 18 comprising a second thermoplastic composition and having a channeled surface 20 defining a plurality of channels 22 and an outer surface 24 opposite the channeled surface 20. The battery interface portion 12 and the base portion 18 are melt-bonded such that the chamber surface 16 cooperates with the plurality of channels 22 of the channeled surface 20 to define a flow chamber 26 for circulating a thermal cooling fluid within the thermoplastic heat exchanger 10. Heat from the battery module is transferred to the thermal cooling fluid circulating in the flow chamber 26 to cool the battery module.

The thermoplastic heat exchanger 10 includes the battery interface portion 12, which is extruded and comprises the first thermoplastic composition. The first thermoplastic composition comprises a polymer selected from polyamide, polycarbonate, and polypropylene. In some examples the first thermoplastic composition comprises a polyamide (nylon) selected from the group of polyamide 6, polyamide 11, polyamide 12, polyamide 46, polyamide 6,6, polyamide 6,10, polyamide 6,12, and polyamide PPA. In a preferred example, the first thermoplastic composition comprises polyamide 6 or polyamide 6,6.

In some examples, the first thermoplastic composition is thermally conductive and includes polyamide 6 (PA6). The first thermoplastic composition of these examples exhibits good electrical conductivity, electromagnetic shielding (EMI) and radio frequency (RF) shielding characteristics. In many examples, the first thermoplastic composition comprises polyamide, is a thermally conductive and can be injection molded or extruded, which are processing characteristics previously unavailable in thermally conductive thermoplastic compositions. As such, the first thermoplastic composition provides design freedom and excellent performance in applications previously restricted to metals. One particular, non-limiting example of the first thermoplastic composition is available under the trade name COOLPOLY® E3617, from Celanese of Dallas, TX. Another particular, non-limiting example is available under the trade name COOLPOLY® E3609, which is commercially available through Celanese of Dallas, TX.

The battery interface portion 12 abuts the battery cell (not illustrated) and thus absorbs and passes thermal energy to the thermal cooling fluid circulating through the flow chamber 26. In some examples, the first thermoplastic composition comprises the polyamide having a thermal conductivity of from 10 to 50, from 20 to 50, from 30 to 50, from 32 to 50, or from 32 to 43 W/(m·K) when tested in accordance with American Standard Test Method ("ASTM") E1461-13: 2022. In some such examples, the first thermoplastic composition has a greater thermal conductivity than the second thermoplastic composition.

Typically, the first thermoplastic composition comprises a filler. Exemplary fillers include mineral fillers. Some non-limiting examples of mineral filler include particles and fibers comprising barites, calcium carbonate, carbon and carbon black, clays (e.g., kaolin clay), glass, mica, silica, talc, and wollastonite. In many examples, the first thermoplastic composition comprises a filler selected from aramid fibers, carbon fibers, cellulose fibers, acrylic fibers, polyvinyl alcohol fibers, glass fibers, and mineral fibers. When a fibrous filler is included in the first thermoplastic composition, the first thermoplastic composition can exhibit direction-dependent thermal conductivity due to an orientation of the filler material. Of course, the first thermoplastic composition can comprise one or more distinct types of filler, e.g., silica particles and aramid fibers.

In some examples, the first thermoplastic composition has a specific gravity of from 1.2 to 2.0, from 1.4 to 1.8, from 1.5 to 1.7, or from 1.55 to 1.65 g/cm$^3$, when tested in accordance with International Organization for Standardization ("ISO") 1183-1:2019.

In many examples, the battery interface portion 12 is extruded in sheet form and has a thickness of from 0.5 to 5 mm, from 0.7 to 2, or from 1 to 1.5 mm. In some examples, the battery interface portion 12 can be profile extruded to match the contours of the battery module. The battery interface portion 12 can have varying thickness, e.g., be thicker on the exterior edges and thinner in the middle portion of the extrusion. In other examples, the battery interface portion 12 can be extruded and then press molded or vacuum formed to match the contours of the battery module. Press molding and vacuum forming can also be used to selectively increase or decrease the thickness of the battery interface portion 12 for design purposes.

As described above, the thermoplastic heat exchanger 10 also includes the base portion 18 comprising a second thermoplastic composition and having a channeled surface 20 defining a plurality of channels 22 and the outer surface 24 opposite the channeled surface 20. The second thermoplastic composition can be described just like the first thermoplastic composition. For example, the second thermoplastic composition comprises a polymer, preferably a polyamide, and may also comprise a filler, and for the sake of brevity, the description of the first thermoplastic composition is not repeated for the second thermoplastic composition. The second thermoplastic composition can be the same or different than the first thermoplastic composition.

For example, in the method of FIG. 2, the first and second thermoplastic compositions may comprise the same components, e.g., an identical composition comprising polyamide reinforced with a fibrous filler. As another example, in the method of FIG. 3, the first and second thermoplastic compositions may comprise the different components, e.g. the first thermoplastic composition may comprise a composition including polyamide, fibrous filler and conductive filler whereas the second thermoplastic composition may comprise a composition comprising polyamide, fibrous filler and carbon black so that energy from laser is absorbed at an interface 32 between the battery interface portion 12 and the base portion 18.

In many examples, the first and the second thermoplastic compositions are different, but share a common binder, e.g., both the first and the second thermoplastic compositions include polyamide 6 or both the first and the second thermoplastic compositions include polyamide 6, 6. By using a common binder, the step of melt-bonding the battery interface portion 12 and the base portion 18 creates a durable bond and adequately seals the cooling chamber.

In some examples, the first and second thermoplastic compositions have a melting temperature of from 210 to 300° C. or from 230 to 290° C. In other examples, the first thermoplastic composition has a first melting temperature, and the second thermoplastic composition has a second melting temperature wherein the second melting temperature has a temperature variance of less than 25%, less than 15%, less than 10%, less than 5%, or less than 2%, based on the first melting temperature. In some examples, the first melting temperature is from 232 to 282° C. and the second melting temperature is from 270 to 290° C.

In some examples, the second thermoplastic composition comprises a thermally stable composition including polyamide 6 (PA6) and from 15 to 45 or from 25 to 35% by weight glass fiber based on a total weight of the composition. In many such examples, the second thermoplastic composition can be injection molded or extruded. As such, the second thermoplastic composition provides design freedom and excellent performance in applications previously restricted to metals. One particular, non-limiting example of the first thermoplastic composition is available under the trade name ULTRAMID® B3WG6, from BASF of Ludwigshafen, DE.

In some examples, the second thermoplastic composition has a specific gravity of from 1.0 to 1.8, 1.2 to 1.4, 1.25 to 1.35, or 1.3-1.4 g/cm$^3$, when tested in accordance with ISO1183-1:2019. In many examples, the first thermoplastic composition has a specific gravity that is greater than a specific gravity of the second thermoplastic composition. For example, the specific gravity of the first thermoplastic composition may be 0.10 to 0.20 g/cm$^3$ greater than the specific gravity of the second thermoplastic composition.

As described, the thermoplastic heat exchanger 10 also includes the base portion 18 comprising the second thermoplastic composition and having the channeled surface 20 defining the plurality of channels 22 and the outer surface 24 opposite the channeled surface 20. In many examples, the base portion 18 is injection molded and has a thickness of from 2.5 to 10 mm, or from 3 to 8 mm exclusive the plurality of channels 22. In some examples, a ratio of a thickness of the battery interface portion 12 to a thickness of the base portion 18 is from 1:1 to 1:10, from 1:2 to 1:7, or from 1:3 to 1:6.

In some examples, a depth of the plurality of channels 22 is from 1.5 to 8, from 1.5 to 7, from 4 to 7, from 3 to 8, mm. Alternatively, the depth of the plurality of channels 22 may extend at least 40 to 90% or from 50 to 80% of a total thickness of the thermoplastic heat exchanger 10. Of course, the plurality of channels 22 extends from the channeled surface 20 of the base portion 18 towards the outer surface 24 of the base portion 18. In some examples, the flow chamber 26 has a cross sectional area of from 10 to 900 mm$^2$, or from 10 to 300 mm$^2$.

Figures 8, 9A:
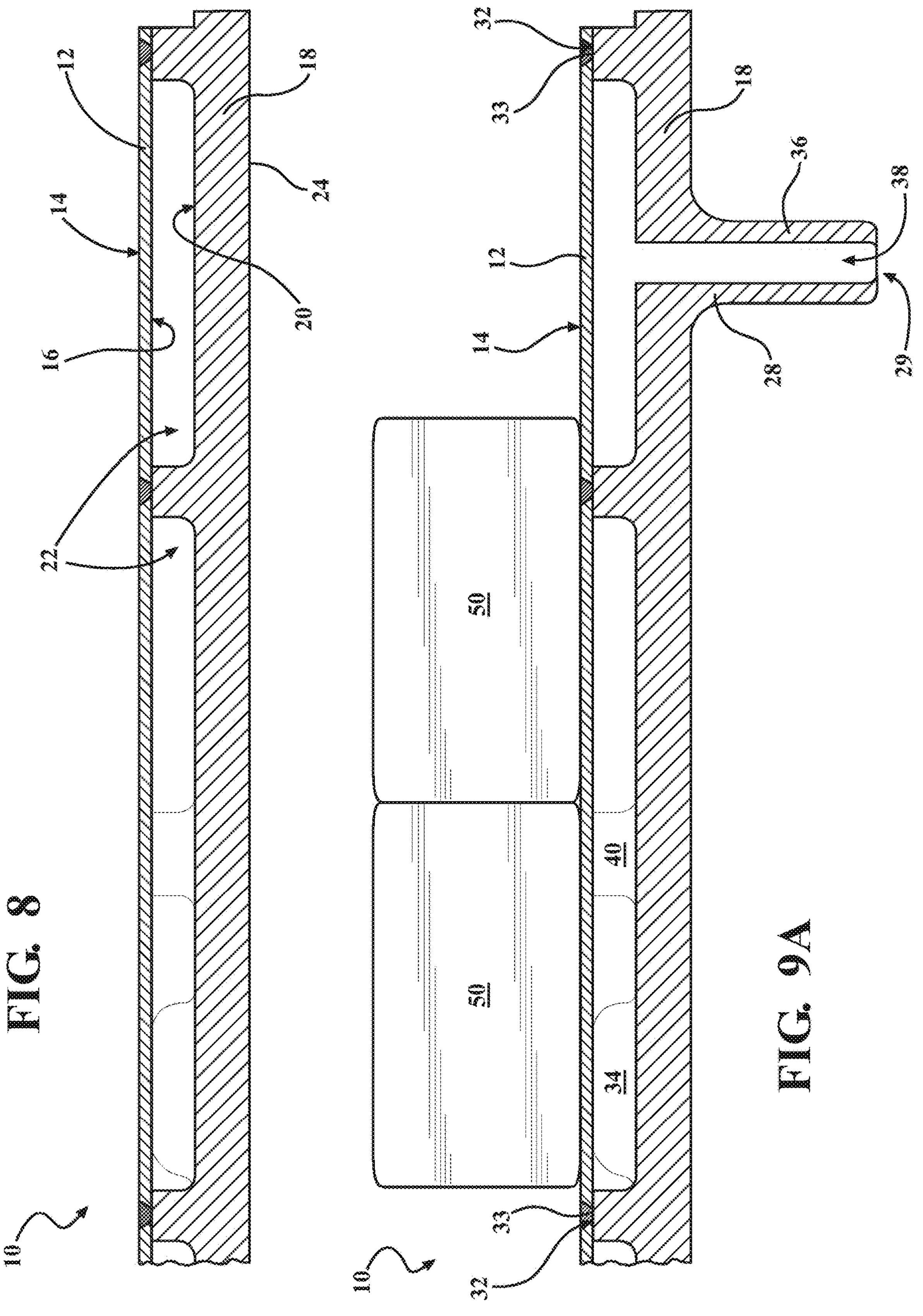
Figure 9B:
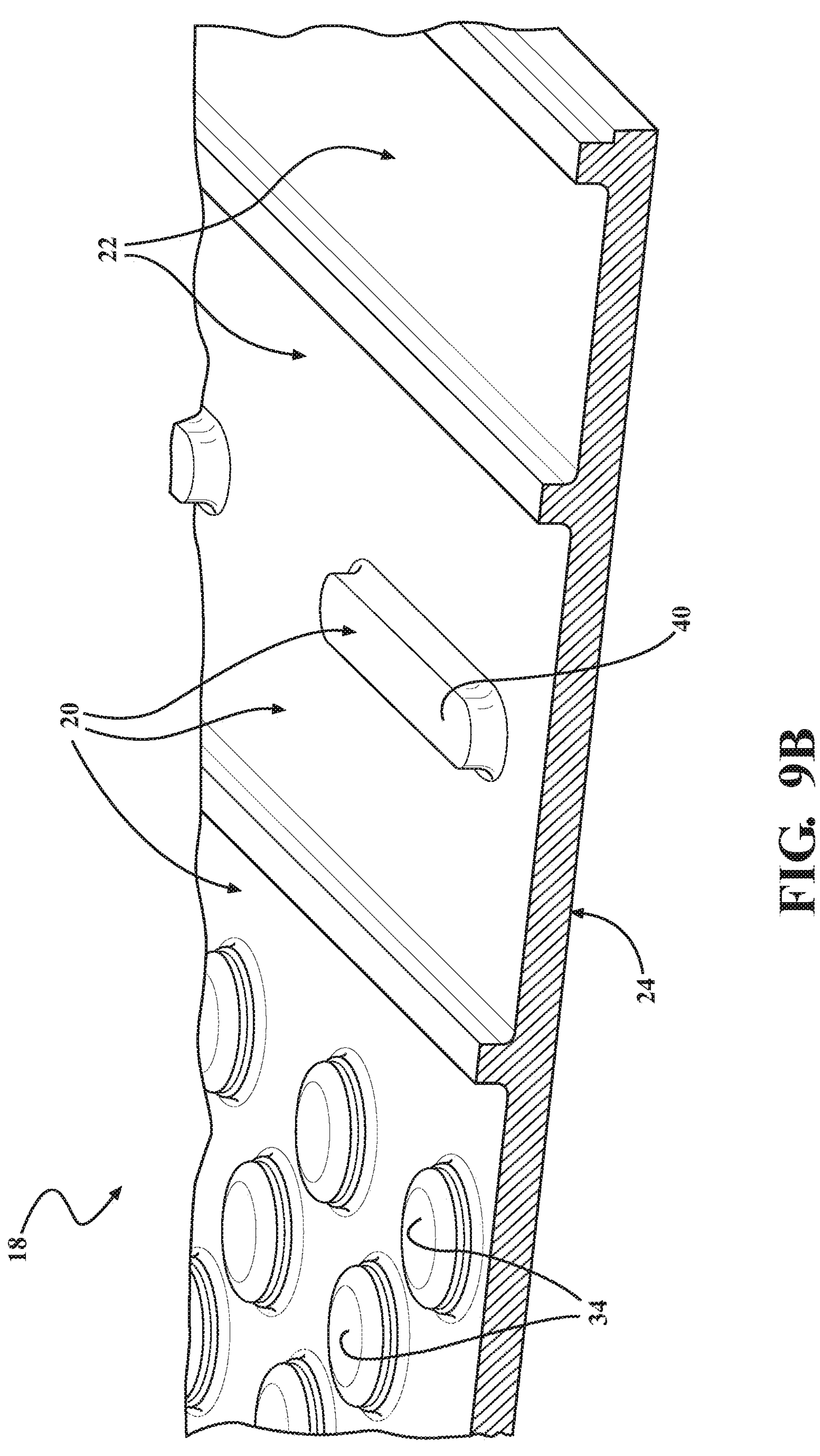
FIG. 9B is an isolated view of a channeled surface of FIG. 9A.

The plurality of channels 22 that constitute the flow chamber 26 are partially defined by the channeled surface 20 formed of the base portion 18. In some examples, portions of the channeled surface 20, e.g. portions defining the plurality of channels 22, are textured, e.g., dimpled or grooved to create turbulence in the thermal cooling fluid flowing through the flow chamber 26. In FIG. 9B, an enlarged view of the channeled surface 20 of FIG. 9A is illustrated with a plurality of projections 34 extending into the plurality of channels 22/flow chamber 26. In FIGS. 8, 9A, and 9B, the plurality of projections 34 extend into the flow chamber 26 and all the way to the chamber surface 16 of the battery interface portion. If included, the plurality of projections 34 can, as illustrated, extend to and contact the chamber surface 16 of the battery interface portion 12. In some embodiments, although not illustrated, the plurality of projections can, extend partially to (but not contact) the chamber surface 16 of the battery interface portion 12. The plurality of projections 34 are defined by the channeled surface and extend toward the chamber surface of the battery interface portion. In some examples, the depth or width of the plurality of channels is varied to create turbulence and/or slow the thermal cooling fluid down. In still other examples, portions of the channeled surface can be ribbed create turbulence and/or slow the thermal cooling fluid down. Since the base portion 18 is molded, a depth of the channels can be varied by going deeper shallower where necessary or a surface texture can be added.

In FIG. 9B, an enlarged view of the channeled surface 20 of FIG. 9A is illustrated with support pillars 40 molded into the channeled surface 20 of the base portion 18. The support pillars 40 are defined by the channeled surface 20 and extend toward and contact the chamber surface of the battery interface portion. Notably, the plurality of channels illustrated in FIG. 7 creates a linear flow path whereas the partial view of FIGS. 9A and 9B show a non-linear flow path with the flow chamber comprises chambers that are broken up by the support pillars and walls that provide contact point for welding and support the battery interface portion. That is, in some embodiments, the flow chamber comprises one or more cavities broken up by walls and/or support pillars to define the plurality of channels. In such embodiments, a non-linear flow path can be created.

As set forth above, in various embodiments, portions of the channeled surface 20 can be textured during molding of the base portion 18, e.g. dimpled, to create fluidic turbulence in the flow chamber 26. In some embodiments, portions of the channeled surface 20 can be ribbed during molding of the base portion to create fluidic turbulence and strengthen the flow chamber 26. Projections 34 and support pillars 40 can also be molded into the channeled surface 20 to create turbulence, provide support for the battery interface portion 12, and/or provide additional contact points for welding. To this end, a variety of different channel configurations and flow chambers can be designed with ease because the base portion 18 is molded. That is, step of molding the base portion 18 provides design flexibility.

In some examples, the outer surface 24 of the base portion 18 is ribbed. The ribs contribute to the structural integrity to thermoplastic heat exchanger 10. The ribs can be formed across, along, or even diagonal on the outer surface. The ribs can run across and along the outer surface 24 to form a grid-like reinforcing structure on the outer surface 24.

Referring again to FIGS. 8 and 9A, the battery interface surface 14 of the battery interface portion 12 is in contact with a battery cell 50 and the base portion 18. The battery interface portion 12, which is extruded, presents consistent, flat surfaces with minimal irregularities to (1) optimize contact between the battery interface surface 14 and the battery cell 50; and (2) to optimize contact between the battery interface portion 12 and the base portion 18 to provide a consistent, strong and robust welds and weld seam(s) between the battery interface portion 12 and the base portion 18 and eliminates surface to surface concerns that can be an issue with two molded parts being mated together and then laser welded.

Referring now to FIGS. 5 and 9A, the thermoplastic heat exchanger includes the inlet port 28 defining the first opening 29 and the outlet port 30 defining the second opening 31, the inlet port 28 and the outlet port 30 are in fluid communication with the flow chamber 26.

In some examples, the thermoplastic heat exchanger 10 further comprises at least one additional flow chamber or a plurality of flow chambers. Of course, such a configuration requires two or more inlet ports and two or more outlet ports.

FIG. 8 is a partial, cross-sectional side view of an embodiment of the thermoplastic heat exchanger 10 including the battery interface portion 12 and the base portion 18. FIG. 9A is a partial, cross-sectional side view of the thermoplastic heat exchanger 10 including a battery interface portion 12 and a base portion 18 with the inlet port 28 (also referred to as a spigot) molded thereto. Of course, FIG. 9A could also be an output port. That is in many embodiments, the inlet port and the outlet port have the same design, and are simply located in different positions. FIGS. 8, 9A, and 9B illustrate an inlet port 28 having a body 36 comprising the third thermoplastic composition and defining a flow channel 38 and the first opening 29 in fluid communication with the flow chamber 26. In FIG. 9A, the inlet port 28 is molded to the base portion 18. The inlet port can be spin molded to the base portion or simply injection molded as a feature of the base portion. FIG. 9A also provides a side view of the interface 32 between the two portions 12, 18 where a weld seam 33 is formed.

As noted above, the thermoplastic heat exchanger 10 is suitable for use in combination with a battery module (not illustrated), and in particular a battery module for an electric vehicle. Because the thermoplastic heat exchanger 10 includes lightweight plastic materials and lacks a seal gasket and fasteners, the thermoplastic heat exchanger 10 achieves cost and weight advantages over existing designs. For example, a battery module with a stack of battery cells (each having a cathode plate, a separator, and an anode plate) can be in thermal communication with one or more of the thermoplastic heat exchanger 10. As is known in the art, the battery cells can be adjacent each other or stacked in predetermined intervals, such that adjacent battery cells are spaced apart from each other. The control of the temperature of the battery cells is maintained within a predetermined range to optimize the performance of the battery cells, optionally between 5° C. and 50° C., with the aid of one or more temperature sensors. In extremely cold environments, however, the thermoplastic heat exchanger 10 can warm the battery cells to achieve the temperature within the predetermined desired range.

The above description is that of current examples of the disclosure. Various alterations and changes can be made without departing from the spirit and broader aspects of the disclosure as defined in the appended claims, which are to be interpreted in accordance with the principles of patent law including the doctrine of equivalents. This disclosure is presented for illustrative purposes and should not be interpreted as an exhaustive description of all examples of the disclosure or to limit the scope of the claims to the specific elements illustrated or described in connection with these examples. For example, and without limitation, any individual element(s) of the described disclosure may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed examples include a plurality of features that are described in concert and that might cooperatively provide a collection of benefits. The present disclosure is not limited to only those examples that include all these features or that provide all the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A method for manufacturing a thermoplastic heat exchanger for a battery module, the method comprising:

extruding a battery interface portion having a battery interface surface and a chamber surface opposite the battery interface surface, the battery interface portion comprising a first thermoplastic composition;

injection molding a base portion having a channeled surface defining a plurality of channels and an outer surface opposite the channeled surface, the base portion comprising a second thermoplastic composition; and melt-bonding the battery interface portion and the base portion such that the chamber surface cooperates with the plurality of channels of the channeled surface to define a flow chamber for a thermal cooling fluid within the thermoplastic heat exchanger;

wherein the step of melt-bonding the battery interface portion and the base portion comprises the steps of:

contacting a first bonding portion of the chamber surface with a laser beam;

contacting a second bonding portion of the channeled surface with another laser beam; and subsequently contacting the chamber surface and the channeled surface to weld the battery interface portion and the base portion and form the thermoplastic heat exchanger.

2. The method of claim 1 wherein the step of contacting the chamber surface and the channeled surface to weld the battery interface portion and the base portion is conducted robotically.

3. The method of claim 1 wherein the step of melt-bonding the battery interface portion and the base portion comprises:

contacting the battery interface portion and the base portion to form an interface between the chamber surface and the channeled surface; and contacting the battery interface surface or the outer surface with the laser beam such that the laser beam travels through the battery interface portion or the base portion, respectively, to melt the first and/or the second thermoplastic compositions at the interface and weld the battery interface portion and the base portion together to form the thermoplastic heat exchanger.

4. The method of claim 3 wherein one of the first and/or the second thermoplastic composition is transparent to the laser beam having a particular wavelength and one of the first and/or the second thermoplastic composition is absorbed by the laser beam having a particular wavelength such that energy from the laser beam is concentrated at the interface allowing both the first and the second thermoplastic compositions to be melted at the interface.

5. The method of claim 4 wherein the first thermoplastic composition has a greater transparency to laser wavelengths in the infrared and near-infrared spectrum than the second thermoplastic composition.

6. The method of claim 1 wherein the first and the second thermoplastic composition are the same or different and comprise a polymer selected from polyamide, polycarbonate, and polypropylene.

7. The method of claim 1 wherein the first and/or the second thermoplastic composition comprises a polyamide selected from polyamide 6, polyamide 11, polyamide 12, polyamide 46, polyamide 6,6, polyamide 6,10, polyamide 6,12, and polyamide PPA.

8. The method of claim 7 wherein the first and/or the second thermoplastic composition comprises a fibrous filler selected from aramid fibers, carbon fibers, cellulose fibers, acrylic fibers, polyvinyl alcohol fibers, glass fibers, and mineral fibers.

9. The method of claim 1 wherein the first thermoplastic composition has a greater thermal conductivity than the second thermoplastic composition.

10. The method of claim 1 wherein:

the battery interface portion has a thickness of from 0.5 to 5 mm; and the base portion has a thickness of from 2.5 to 10 mm exclusive of the plurality of channels.

11. The method of claim 1 wherein the flow chamber has a cross sectional area of from 10 to 900 $mm^2$.

12. The method of claim 1 further comprising the step of injection molding an inlet port and an outlet port each having a body and defining a flow channel into the base portion.

13. The method of claim 1 further comprising the step of injection molding an inlet port comprising a third thermoplastic composition and an outlet port comprising a fourth thermoplastic composition.

14. The method of claim 13 further comprising the steps of:

drilling and/or molding a first and a second opening into the battery interface portion and/or the base portion, the first and a second opening in fluid communication with the flow chamber;

rotationally contacting the inlet port about a perimeter of the first opening to generate friction sufficient to melt a portion of the third thermoplastic composition;

cooling the melted portion of the third thermoplastic composition to weld the inlet port to the thermoplastic heat exchanger;

rotationally contacting the outlet port about a perimeter of the second opening to generate friction sufficient to melt a portion of the fourth thermoplastic composition; and cooling the melted portion of the fourth thermoplastic composition to weld the outlet port to the thermoplastic heat exchanger.

* * * * *